US009419900B2

(12) United States Patent
Anghel et al.

(10) Patent No.: US 9,419,900 B2
(45) Date of Patent: Aug. 16, 2016

(54) MULTI-BIT INDICATOR SET ACCORDING TO FEEDBACK BASED ON AN EQUILIBRIUM LENGTH OF A QUEUE

(71) Applicant: International Business Machines Corporation, Armonk, NY (US)

(72) Inventors: Andreea-Simona Anghel, Adliswil (CH); Claude Basso, Nice (FR); Robert Birke, Kilchberg (CH); Daniel Crisan, Zug (CH); Mircea Gusat, Langnau (CH); Keshav G. Kamble, Fremont, CA (US); Cyriel J. Minkenberg, Gutenswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 102 days.

(21) Appl. No.: 14/145,683

(22) Filed: Dec. 31, 2013

(65) Prior Publication Data

US 2015/0188820 A1    Jul. 2, 2015

(51) Int. Cl.
*H04L 12/807* (2013.01)
*H04L 12/861* (2013.01)
(Continued)

(52) U.S. Cl.
CPC .............. *H04L 47/115* (2013.01); *H04L 47/10* (2013.01); *H04L 47/50* (2013.01)

(58) Field of Classification Search
CPC ..... H04L 47/10; H04L 47/2441; H04L 47/30; H04L 47/32; H04L 12/5693
USPC ........................................................ 370/235
See application file for complete search history.

(56) References Cited

U.S. PATENT DOCUMENTS

| 5,367,523 A | * | 11/1994 | Chang ..................... H04L 47/10 370/235 |
| 5,751,969 A | * | 5/1998 | Kapoor .............. H04Q 11/0478 370/235 |
| 6,535,482 B1 | | 3/2003 | Hadi Salim et al. |

(Continued)

FOREIGN PATENT DOCUMENTS

CN          101964755 A       2/2011

OTHER PUBLICATIONS

International Search Report and Written Opinion from International Application No. PCT/IB2014/066584, dated Mar. 16, 2015.

(Continued)

*Primary Examiner* — Omar Ghowrwal
*Assistant Examiner* — Sanjay K Dewan
(74) *Attorney, Agent, or Firm* — Zilka-Kotab, PC

(57) ABSTRACT

According to one embodiment, a method for handling congestion in a network includes determining that there is congestion on a first device in a network, setting a congestion indicator in a header of a packet to indicate an amount of congestion at the first device, sending the packet to all devices that send traffic to the first device, receiving the packet having the multi-bit indicator in a header thereof at a device that sends traffic to the first device, and reducing a congestion window by a factor of between about 5% and about 50% based on a severity of the congestion indicated by the multi-bit indicator, wherein the congestion window is reduced by a greater factor when the congestion is indicated as being more severe. Other systems and methods for handling congestion in a network are described according to more embodiments.

17 Claims, 9 Drawing Sheets

(51) Int. Cl.
*H04L 12/801* (2013.01)
*H04L 12/863* (2013.01)

(56) References Cited

U.S. PATENT DOCUMENTS

| | | | | |
|---|---|---|---|---|
| 6,661,802 | B1* | 12/2003 | Homberg | H04L 12/5601 370/229 |
| 6,876,639 | B1 | 4/2005 | Cao | |
| 6,888,824 | B1* | 5/2005 | Fang | H04L 49/103 370/359 |
| 7,558,197 | B1* | 7/2009 | Sindhu et al. | 370/230 |
| 7,773,519 | B2* | 8/2010 | Prabhakar | H04L 47/10 370/230.1 |
| 8,593,970 | B2* | 11/2013 | Godbole | H04L 47/26 370/235 |
| 8,873,396 | B2* | 10/2014 | Tay | H04L 47/10 370/230 |
| 2005/0188109 | A1* | 8/2005 | Shiga | H04L 47/263 709/239 |
| 2005/0286416 | A1* | 12/2005 | Shimonishi et al. | 370/229 |
| 2006/0015639 | A1* | 1/2006 | Taylor | H04L 41/0896 709/235 |
| 2006/0092840 | A1* | 5/2006 | Kwan | H04L 47/10 370/230.1 |
| 2007/0081454 | A1* | 4/2007 | Bergamasco | H04L 47/10 370/229 |
| 2009/0052326 | A1* | 2/2009 | Bergamasco | H04L 47/10 370/236 |
| 2009/0113069 | A1* | 4/2009 | Prabhakar | H04L 43/0882 709/235 |
| 2009/0180380 | A1* | 7/2009 | Prabhakar | H04L 47/10 370/232 |
| 2009/0268614 | A1* | 10/2009 | Tay | H04L 47/10 370/236 |
| 2011/0211449 | A1* | 9/2011 | Attar | H04L 47/10 370/235 |
| 2012/0033550 | A1 | 2/2012 | Yano et al. | |
| 2012/0051216 | A1* | 3/2012 | Zhang | H04L 47/12 370/230 |
| 2012/0163176 | A1* | 6/2012 | Matsuoka | H04L 47/10 370/235 |
| 2013/0223219 | A1 | 8/2013 | Mir et al. | |
| 2015/0023172 | A1* | 1/2015 | Calavrezo | H04L 47/11 370/236 |
| 2015/0029887 | A1* | 1/2015 | Briscoe et al. | 370/252 |

OTHER PUBLICATIONS

Alizadeh et al., "DCTCP: Efficient Packet Transport for the Commoditized Data Center," in Proc. ACM SIGCOMM 2010, 2010, pp. 1-15.

Devkota et al., "Performance of Quantized Congestion Notification in TCP Incast Scenarios of Data Centers," in Proc. 2010 IEEE International Symposium on Modeling, Analysis and Simulation of Computer and Telecommunication Systems (Mascots 2010), Aug. 2010, pp. 1-9.

* cited by examiner

MULTI-BIT INDICATOR SET ACCORDING TO FEEDBACK BASED ON AN EQUILIBRIUM LENGTH OF A QUEUE

BACKGROUND

The present invention relates to data center infrastructure and usage, and more particularly, this invention relates to a quantized congestion notification (QCN) extension to Explicit Congestion Notification (ECN) for transport-based end-to-end congestion notification.

Data Center Transmission Control Protocol (DCTCP) was created in 2010 and is a prevalent data center transport and TCP Incast/Hadoop solution, which is currently adopted by many standards organizations and companies, such as the Internet Engineering Task Force (IETF), Linux, Microsoft, Cisco, etc.

DCTCP uses a modified Random Early Detection (RED)/ECN feedback and a multi-bit feedback estimator that filters incoming single-bit ECN streams. This compensates the halving of the TCP congestion window (partly similar to QCN's reaction point) with a smooth congestion window (cwnd) reduction function, reminiscent of QCN's rate decrease, hence departing from TCP's halving of the cwnd.

DCTCP reduces flow completion times (FCTs) on average by about 29%; however, since DCTCP is deadline-agnostic, DCTCP also misses about 7% of the deadlines. Also, DCTCP surreptitiously attempts to mimic not only QCN reaction point (RP) behavior (it has a smoother reaction than TCP's halving of the cwnd), but also the multi-bit QCN congestion point (CP) feedback, which is derived from the congestion notification message (CNM) 6*b* congestion Fb, as inferred from timeseries of sparse, single-bit ECN marking streams.

Now, relating to QCN, but not DCTCP, TCP Incast in a QCN-enabled lossy network has a problem where the process may actually result in the loss of some information, which may be in conflict with a default assumption of lossless Converged Enhanced Ethernet (CEE).

SUMMARY

According to one embodiment, a system includes a processor and logic integrated with and/or executable by the processor, the logic being configured to determine that there is congestion on a first device in a network, set a congestion indicator in a header of a packet to indicate an amount of congestion at the first device, and send the packet to all devices that send traffic to the first device.

In another embodiment, a method for handling congestion in a network includes determining that there is congestion on a first device in a network, setting a congestion indicator in a header of a packet to indicate an amount of congestion at the first device, and sending the packet to all devices that send traffic to the first device.

Other aspects and embodiments of the present invention will become apparent from the following detailed description, which, when taken in conjunction with the drawings, illustrate by way of example the principles of the invention.

DETAILED DESCRIPTION

Figure 1:
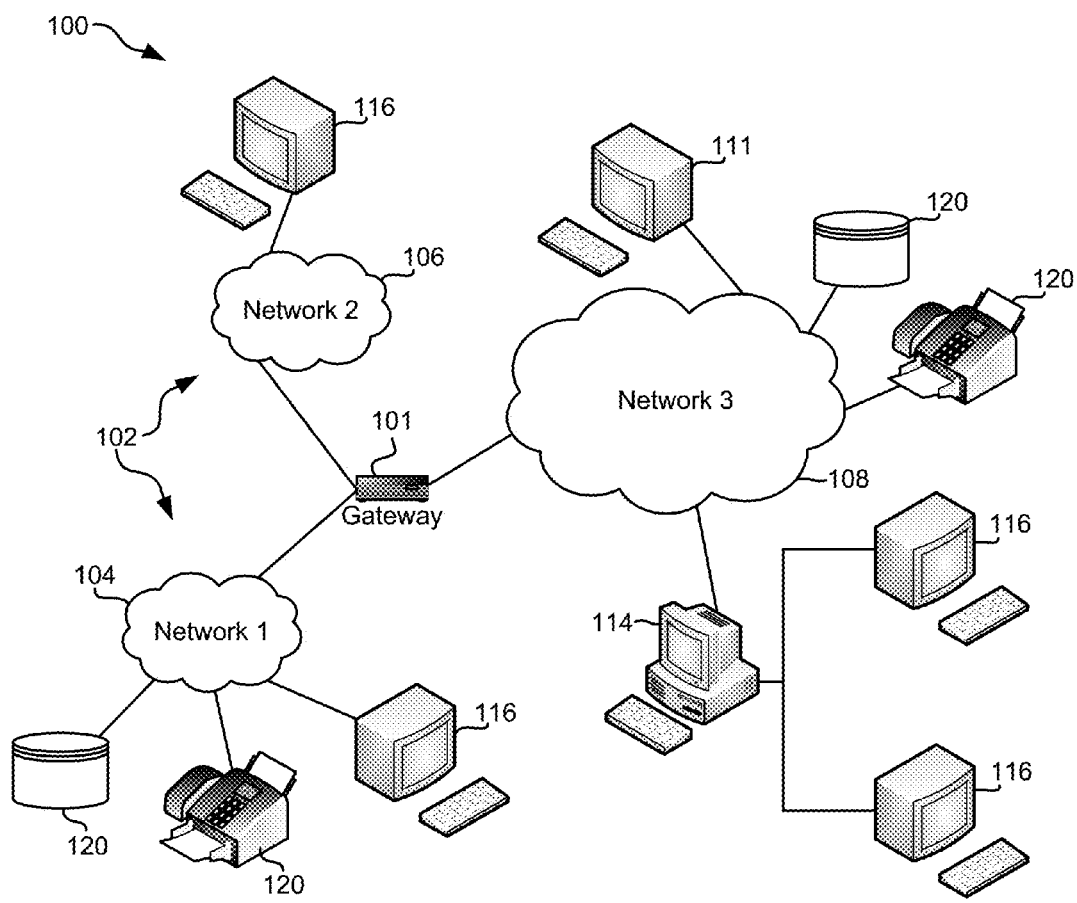
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. Furthermore, "about" as used herein as a relative term includes ±5% of the term which is modified by about. For example, "about 10" includes 9.5, 10.5, and all values therebetween.

According to one general embodiment, a system includes a processor and logic integrated with and/or executable by the processor, the logic being configured to determine that there is congestion on a first device in a network, set a congestion indicator in a header of a packet to indicate an amount of congestion at the first device, and send the packet to all devices that send traffic to the first device.

In another general embodiment, a method for handling congestion in a network includes determining that there is congestion on a first device in a network, setting a congestion indicator in a header of a packet to indicate an amount of congestion at the first device, and sending the packet to all devices that send traffic to the first device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
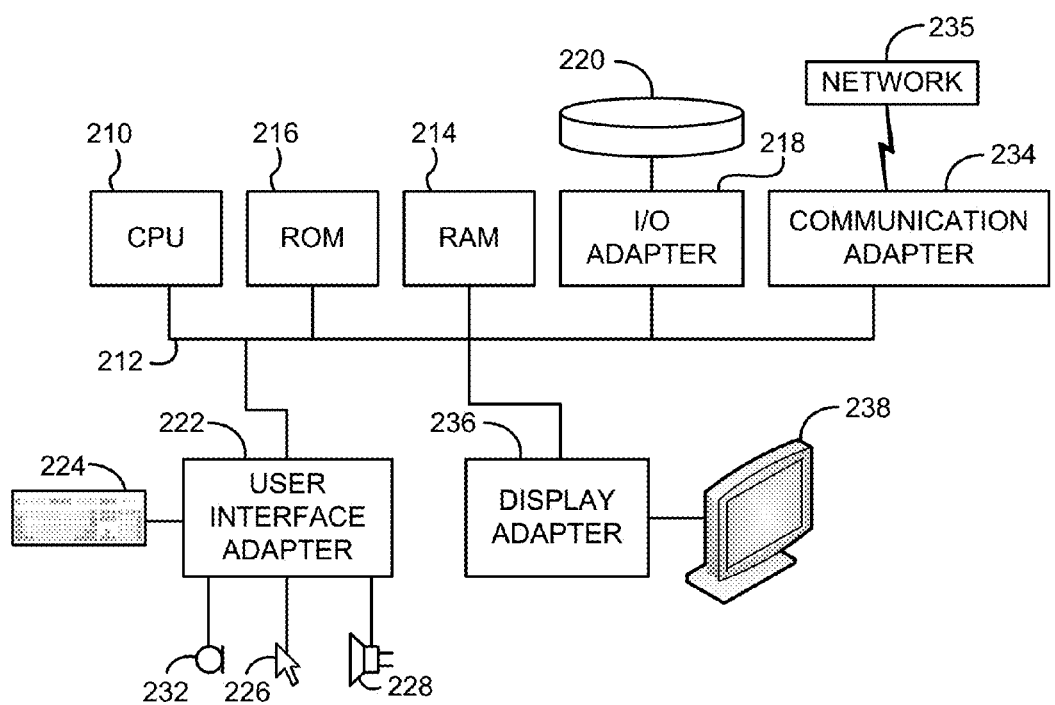
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
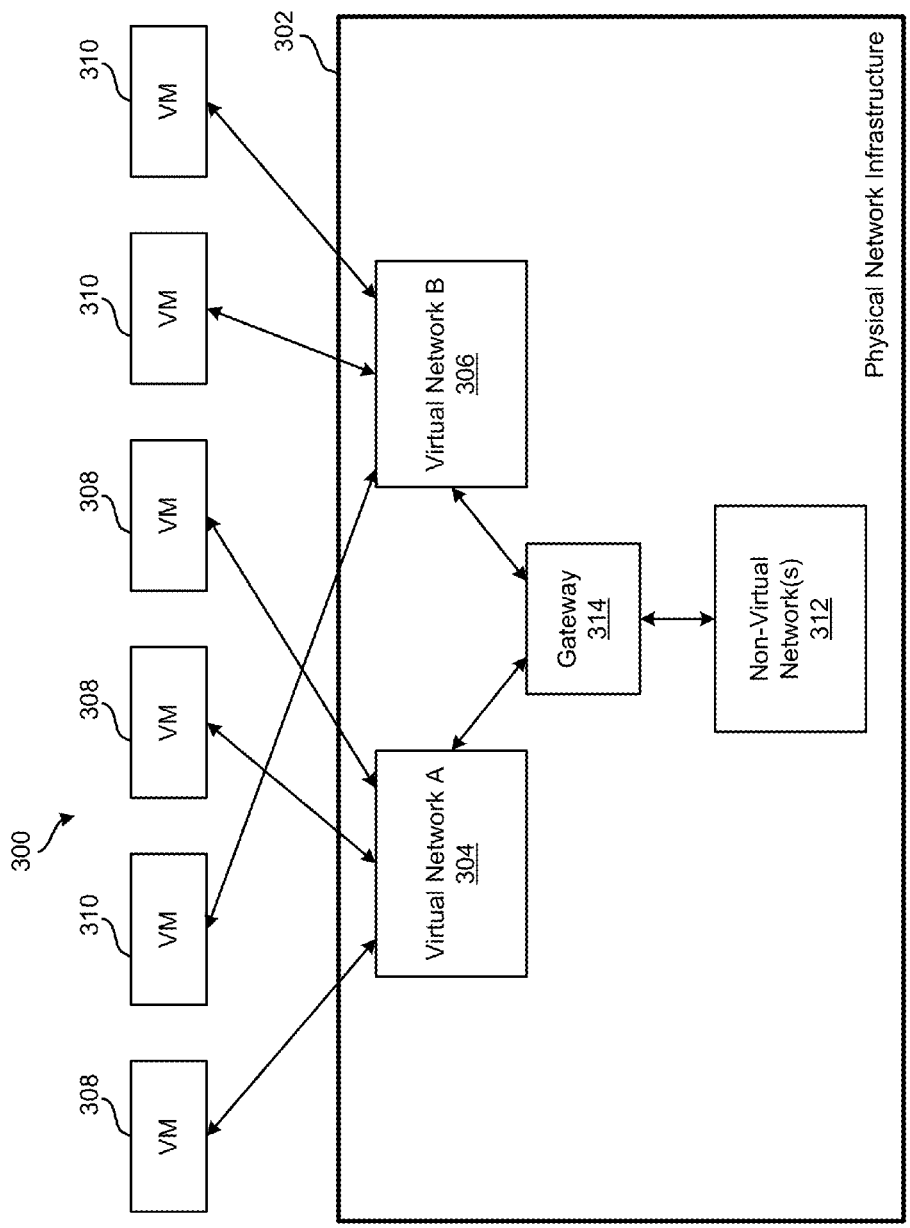
FIG. 3 is a simplified diagram of a virtualized data center, according to one embodiment.

Referring now to FIG. 3, a conceptual view of an overlay network 300 is shown according to one embodiment. The overlay network may utilize any overlay technology, standard, or protocol, such as a Virtual eXtensible Local Area Network (VXLAN), Distributed Overlay Virtual Ethernet (DOVE), Network Virtualization using Generic Routing Encapsulation (NVGRE), etc.

In order to virtualize network services, other than simply providing a fabric communication path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may include one or more cell switched domain scalable fabric components (SFCs) interconnected with one or more distributed line cards (DLCs).

By having a "flat switch" architecture, the plurality of VMs may move data across the architecture easily and efficiently. It is very difficult for VMs, generally, to move across Layer-3 (L3) domains, between one subnet to another subnet, internet protocol (IP) subnet to IP subnet, etc. But if it the architecture is similar to a large flat switch, in a very large Layer-2 (L2) domain, then the VMs are aided in their attempt to move data across the architecture.

Figure 4:
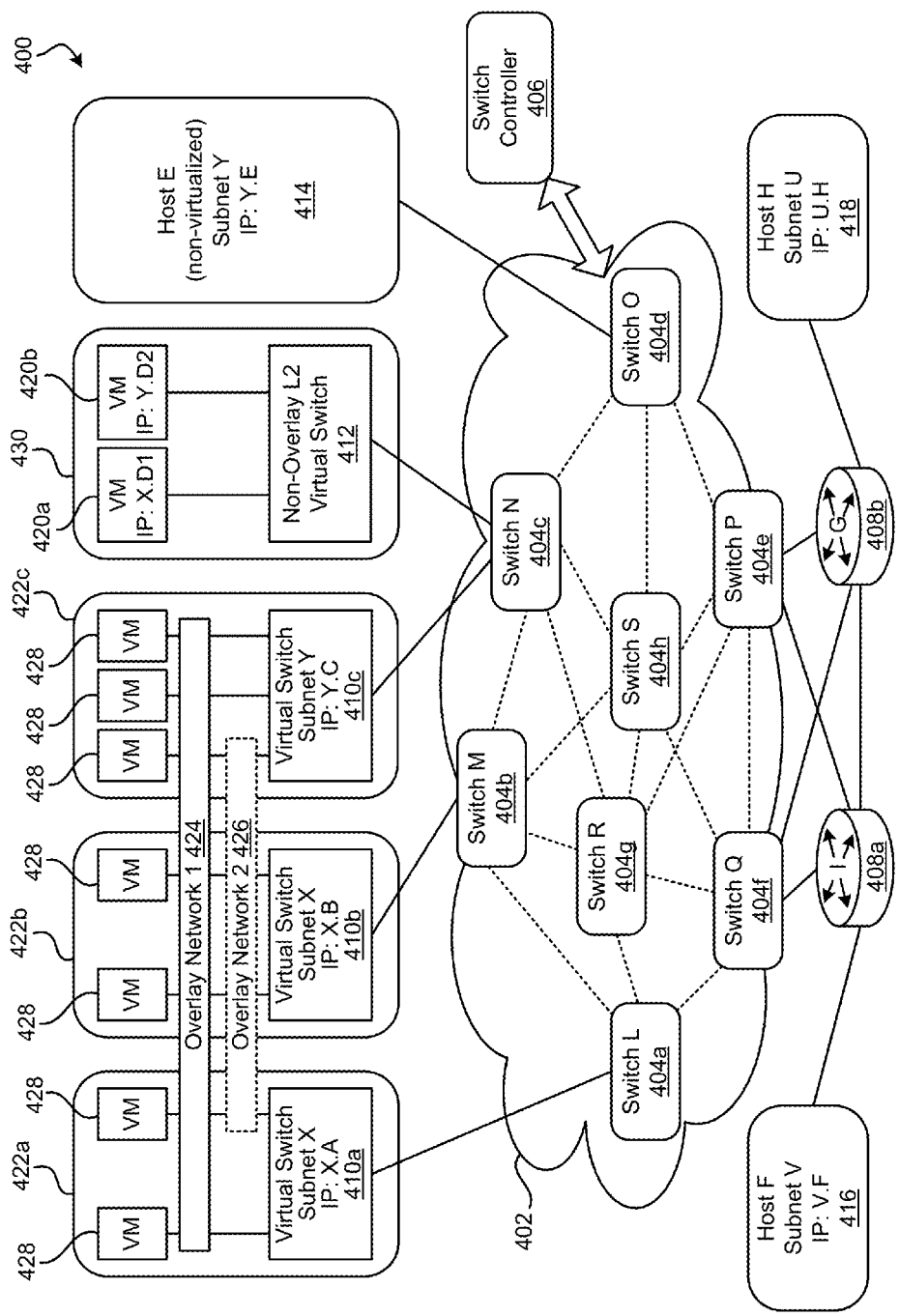
FIG. 4 is a simplified topological diagram of a software defined network (SDN) switch cluster operating as a distributed router, according to one embodiment.

FIG. 4 shows a simplified topological diagram of a SDN system 400 or network having a switch cluster 402 operating as a distributed router, according to one embodiment. The switch cluster 402 comprises a plurality of switches 404a, 404b, . . . , 404n, each switch being connected in the cluster. The switches that are explicitly shown (Switch L 404a, Switch M 404b, Switch N 404c, Switch O 404d, Switch P 404e, Switch Q 404f, Switch R 404g, Switch S 404h) are for exemplary purposes only, as more or less switches than those explicitly shown may be present in the switch cluster 402. An L3 aware switch controller 406, such as an SDN controller, is connected to each switch 404a, 404b, . . . , 404n in the switch cluster 402, either directly or via one or more additional connections and/or devices. Additionally, some switches 404a, 404b, . . . , 404n are connected to one or more other virtual or physical devices external to the switch cluster 402. For example, Switch L 404a is connected to vSwitch 410a, Switch Q 404f is connected to Router I 408a, Switch N 404c is connected to non-overlay L2 vSwitch 412 and vSwitch 410c, etc. Of course, these connections are for exemplary purposes only, and any arrangement of connections, number of switches in the switch cluster 402, and any other details about the system 400 may be adapted to suit the needs of whichever installation it is to be used in, as would be understood by one of skill in the art.

The system 400 also has several devices outside of the switch cluster 402, such as Host F 416 which is connected to the switch cluster 402 via Router I 408a, Host H 418 which is connected to the switch cluster 402 via Router G 408b, Host E 414 which is connected to the switch cluster 402 via Switch O 404d, etc. Also capable of being connected to the switch cluster 402 is a non-overlay L2 virtual switch 412 that is supported by a physical server 430. This server may also host VMs 420a and 420b, which have their own IP addresses.

Three servers 422a, 422b, 422c are shown hosting a plurality of VMs 428, each server having a virtualization platform or hypervisor (such as Hyper-V, KVM, Virtual Box, VMware Workstation, etc.) which hosts the VMs 428 and a vSwitch 410a, 410b, 410c, respectively. In addition, the hosted VMs 428 on the various servers 422a, 422b, 422c may be included in one or more overlay networks, such as Overlay networks 1 or 2 (424 or 426, respectively). How the VMs 428 are divided amongst the overlay networks is a design consideration that may be chosen upon implementing the system 400 and adjusting according to needs and desires.

The number of various devices (e.g., Router G 408b, server 422a, Host E 414, etc.) connected to the switch cluster 402 are for exemplary purposes only, and not limiting on the number of devices which may be connected to a switch cluster 402.

Each device in the system 400, whether implemented as a physical or a virtual device, and regardless of whether it is implemented in hardware, software, or a combination thereof, is described as having an internet protocol (IP) address. Due to limited space, the routers 408a, 408b do not have their IP addresses or subnet information shown. However, Router I 408a is in Subnet W, and has a router address of W.I, while Router G 408b is in Subnet Z and has a router address of Z.G.

Some of the embodiments and approaches described herein may be used in the context of a SDN system 400 as shown in FIG. 4.

Figure 5:
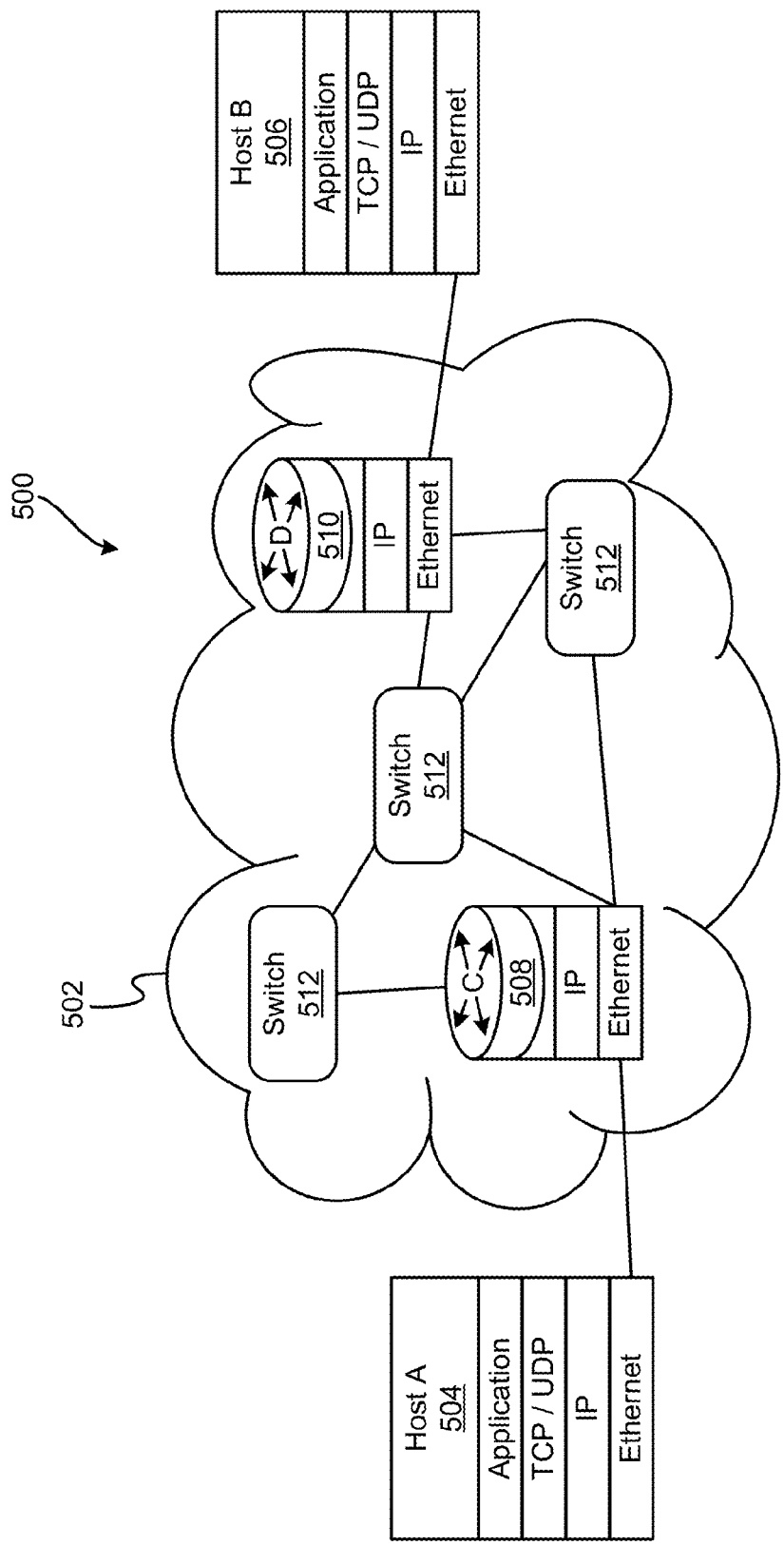
FIG. 5 is a simplified diagram of a system having two hosts connected via a network.

Now referring to FIG. 5, a system 500 is shown having two hosts, Host A 504 and Host B 506, connected through a network 502. Either of the hosts 504, 506 may be a client, a server, or some other entity in a communication arrangement, as would be understood by one of skill in the art. The network 502 may include any number of components used in networking communications, such as routers, switches, servers, etc. As shown, the network 502 includes two routers, Router C 508 and Router D 510, which are connected to one another via a plurality of switches 512. Router C 508 is also connected to Host A 504, while Router D 510 is connected to Host B 506.

In transmission control protocol (TCP)-enabled for operation with Random Early Detection (RED)/Explicit Congestion Notification (ECN), in order for Host A 504 to send a packet to Host B 506, Host A 504 prepares a packet having an application header (App Hdr), a TCP header (TCP Hdr), an IP header (IP Hdr), and an Ethernet header (Eth Hdr), which is sent to Router C 508. Router C 508 then performs a congestion check on the network 502 and marks the IP ECN bit accordingly, and sends the packet to Router D 510, which receives the packet. The IP stack in Router D 510 then forwards the ECN condition indicated by the IP ECN bit to the TCP/UDP stack. The TCP/UDP stack checks the ECN condition and performs ECN Echo (returning a piggyback packet back to Router C 508) followed by Congestion Window adjustment, such as via Congestion Window Reduced (CWR) bits being set to reduce congestion in the network 502.

In this arrangement, several drawbacks exist including the ability to have multiple IP packets with ECN bits set for the same flow, congestion being determined (found) by the routers at a congestion point (CP), but flow control being performed by the TCP stack of the receiving host, and/or large end-to-end round-trip time (RTT) being caused by latency involved in flow control and reaction to indicated conditions.

Figure 6:
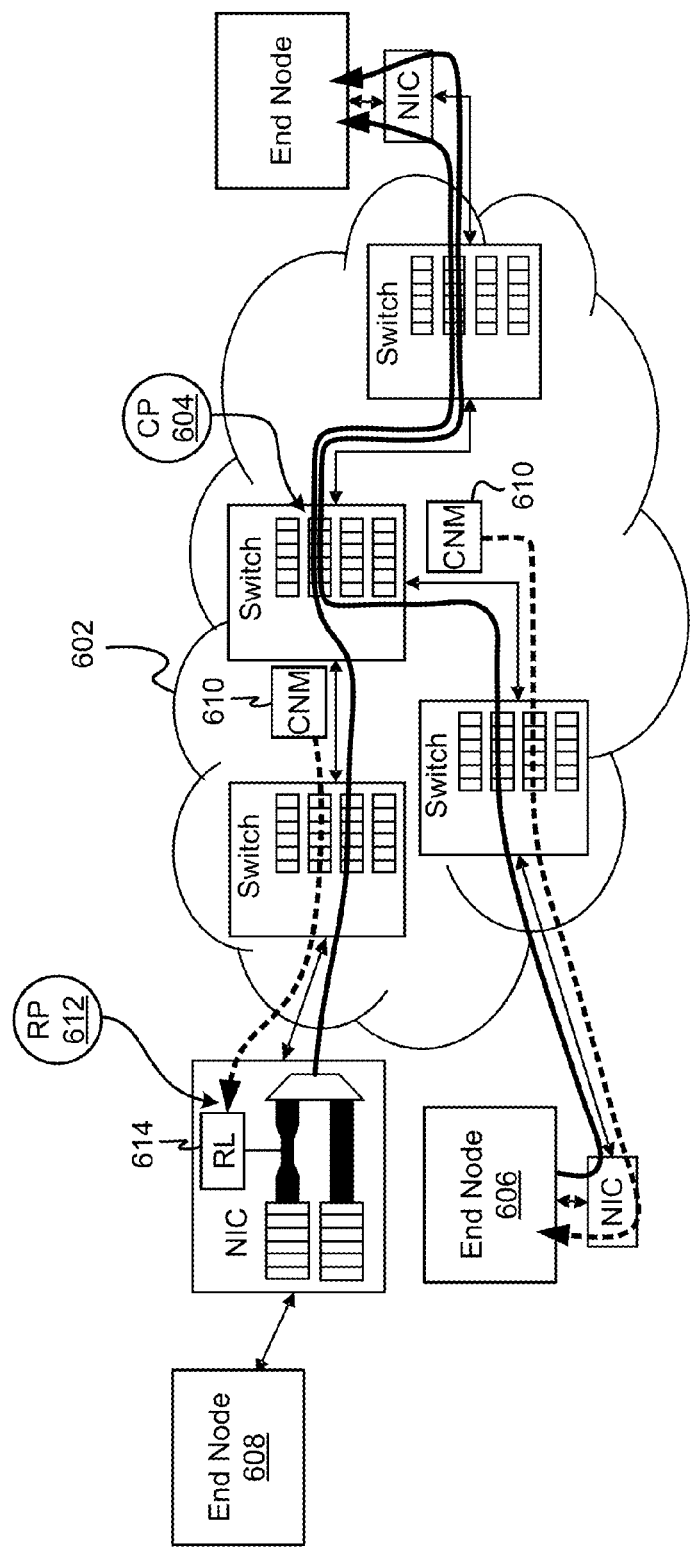
FIG. 6 is a diagram of a network describing converged enhanced Ethernet (CEE) congestion management.

Now referring to FIG. 6, converged enhanced Ethernet (CEE) congestion management is now described. In CEE, a CP 604 (which may be a physical or virtual device, such as a switch output queue) is identified at which congestion takes place in the network 602. Feedback may be computed based on queue occupancy and queue occupancy change. For example, with a sample output queue length being received every n bytes, and an equilibrium length (a set point to maintain about 15% of capacity at any given time, or more or less) being $Q_{eq}$, feedback (Fb) may be computed as:

$$F_b = Q_{off} - W^* Q_{delta}$$

In this equation, $Q_{off} = Q_{eq} - Q_{now}$ and $Q_{delta} = Q_{odd} - Q_{now}$. Feedback for proportional-derivative (PD) control may be calculated based on Position+Velocity+Location. Therefore, backward congestion notifications, as used in Quantized Congestion Notification (QCN), may be conveyed from the location of the CP 604 to sources of "offending" traffic (which presumably are causing the congestion, such as end node 606 and/or 608). These notifications are indicated as CNMs 610.

Notifications may include quantitative congestion pricing, such that the source (SRC) is set as a congestion hotspot MAC and destination (DST) is set to a source MAC of a sampled frame of the offending traffic. Then, Feedback is set to $Q_{offset}$ and $Q_{delta}$, which is quantized with respect to $F_{b,max} = (1+2 W)^* Q_{eq}$ using 6 bits (which indicates 0 to 50% decrease in throughout/output)+raw $Q_{offset}$ and $Q_{delta}$. The Reaction Point (RP) 612 may then use one or more rate limiters (RLs) 614 at the edge to shape flows causing congestion and separately enqueue rate-limited flows. This may reduce the rate limit multiplicatively when $F_b<0$, so that the operation of BCN/ECM, which works well in most common cases, is inherited. This also allows for the rate limit to be increased autonomously based on byte counting or a timer. Also, QCN is similar to TCP-(CU)BIC. Moreover, the rate limiter 614 may be released when the limit returns to full link capacity.

Figure 7A:
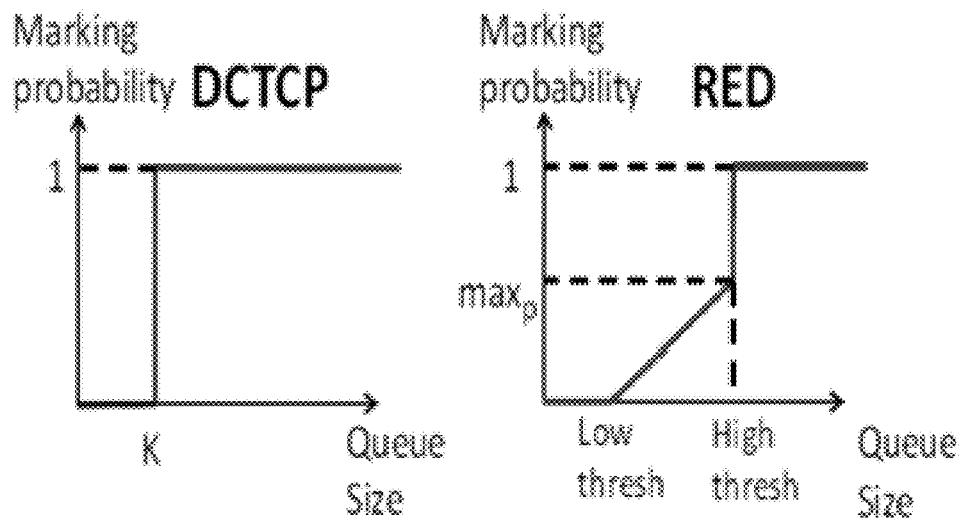
FIGS. 7A-7B show a simplified quantized congestion notification (QCN) CP detector is described according to one embodiment.
Figure 7B:
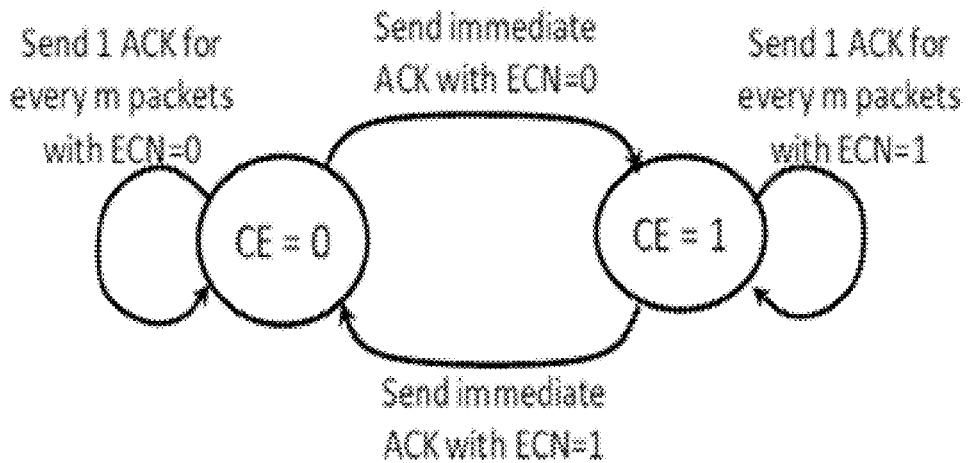

Now referring to FIGS. 7A-7B, a simplified QCN CP detector is described according to one embodiment. The QCN CP detector may be implemented in hardware, software, or a combination of the two. A software implementation may be executed in a SDN or some other suitable network environment which is configured to have one or more controllers which communicate commands and/or settings to devices within the network. The equilibrium length ($Q_{eq}$) may be set as a Data Center TCP (DCTCP)/RED congestion detection threshold (K). The complexity of the standard QCN feedback computation is bypassed in this embodiment.

Packets are sampled with 100% probability. When the queue occupancy is above $Q_{eq}$, which may be set to maintain about 5% to about 25% of capacity, or more or less, such as about 10%, about 15%, about 20%, etc., the packet is marked as RED/ECN using typical RED/ECN algorithms, i.e., by setting the Congestion Experienced (CE) code point. This marking continues as long as the queue occupancy is above $Q_{eq}$ (and is IETF Request For Comments (RFC) 3168 and RFC 6040 compliant, to survive SDN tunnels).

This Feedback loop is fully ECN compatible as it uses the ECN-Echo (ECE), CE, and CWR code points between the source and the destination. It also incurs the full end-to-end RTT delays of RED/ECN, as any DCTCP-compliant scheme. Also, marking is independent of any SDN or overlay tunnel manipulation.

Figure 8:
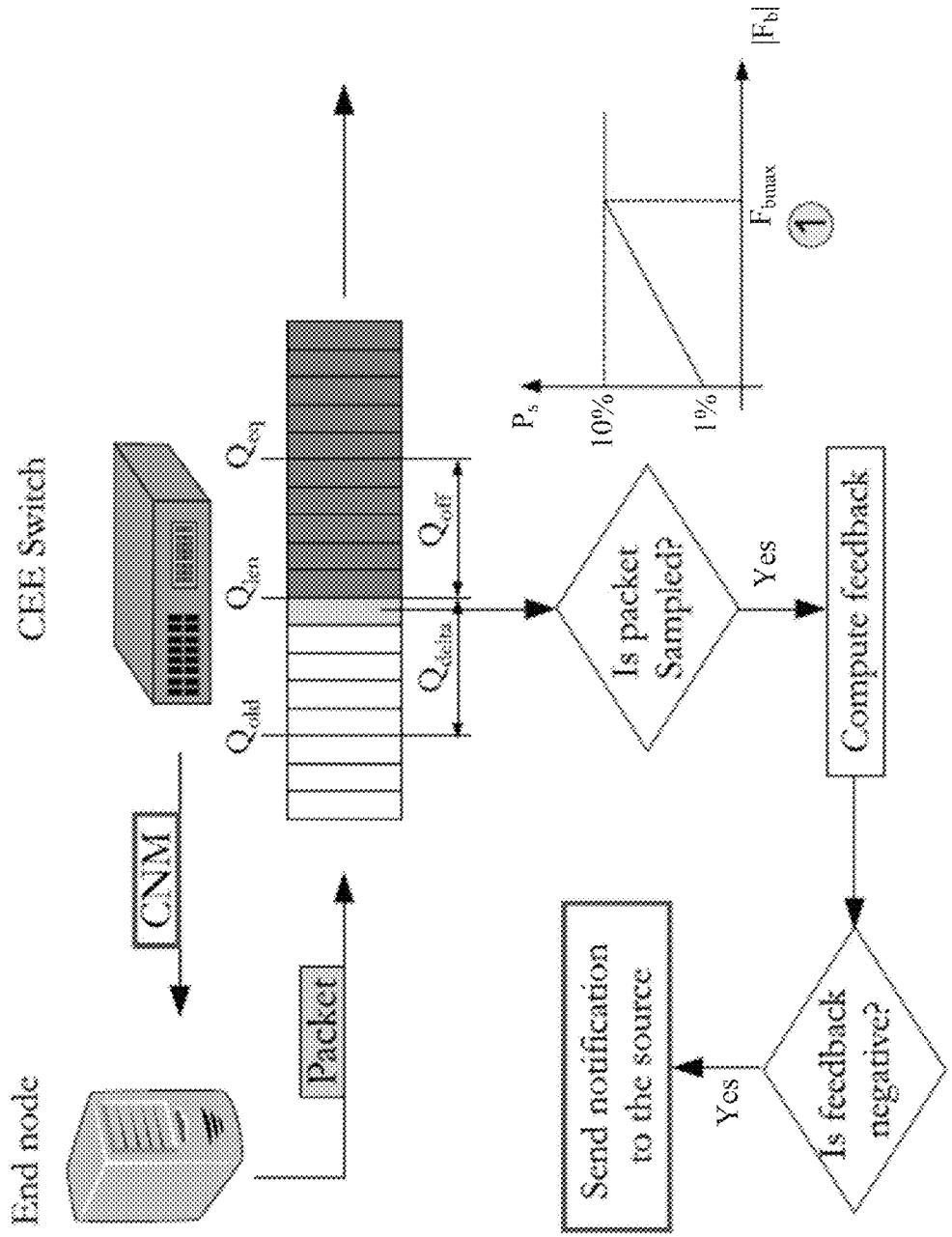
FIG. 8 shows a comparison between a conventional QCN congestion point (CP) mechanism and a data center transmission control protocol (DCTCP) mechanism according to one embodiment.

Now referring to FIG. 8, a comparison is made of the conventional QCN CP mechanism versus the DCTCP implementation described herein (with $Q_{eq}=K$). On packet arrival, the queue occupancy level is set to $Q_{length}$, the change in queue ($Q_{delta}$), equals the queue occupancy level minus the old queue length ($Q_{length}-Q_{old}$). Therefore, with w being a predetermined or fixed parameter (having any desired value as determined by a user or automatically selected in order to cause improvement) and the $Q_{offset}=Q_{eq}-Q_{length}$, with the feedback (FB) being calculated as:

$$FB = Q_{offset} + W^* Q_{delta}$$

By using this feedback, a queue sampling probability (Ps) may be calculated as a function of FB according to the QCN sampling probability function, b=rand( )/RAND_MAX (b is a number uniformly distributed in [0,1]). Then, if (b>Ps), the packet is sampled. This is how a conventional QCN CP mechanism operates.

In DCTCP implementation of QCN CP, $Q_{eq}=K$, with 5% of $Q_{max} \leq K \leq 25\%$ of $Q_{max}$. Therefore, the sampling probability (Ps) is 100%, e.g., Ps=1 (if $q \geq Q_{eq}$, Ps=100% sampling and every packet is marked). In other approaches, K may be less than $Q_{max}$ or more than 25%.

In another embodiment, the destination host no longer participates directly in the QCN-based DCTCP control loop. Therefore, the role of the destination host is now performed by the CP implemented in the device where the CP is located (such as a router, switch, server, etc.). This results in faster reaction to congestion.

The QCN CP is configured to set L3/L4 headers so that the CNM appears to be an ECE packet, e.g., the CWR field is set, etc. Thus, the TCP stack acknowledgement of packet reception is decoupled from congestion signaling. Then, the QCN sampling rate is set at 100%. In one approach, a register counter may be used for every packet source that is updated based on the congestion level of the destination queue of the sampled packet. In addition, a two state machine, similar to those utilized for DCTCP, may be implemented. After this, the source adapts its TCP window according to the feedback value received in the CNM packet (the feedback is a measure of the congestion level encountered in the device at the CP).

For QCN-optimized operation, multi-bit congestion feedback may be utilized where $FB=Q_{offset}+w*Q_{delta}$, as well as the direct backward notification (CNM) as described previously according to various embodiments. This configuration helps to reduce delays (much shorter RTT than ECN alone), but also adds higher overhead, as extra packets are created and inserted in the network. Therefore, it is useful to understand when the QCN CP generates the CNM. This embodiment is simpler than both DCTCP and QCN, while faster than DCTCP, when implemented on L2.

In one embodiment, the CNM generation may be based on a finite-state machine as used in DCTCP at the destination device, with some modifications for use in the QCN CP mechanism. In this approach, QCN CP does not send acknowledgments, e.g., "ACK" messages, when there is no congestion identified. Therefore, there are no lack-of-congestion notifications, which reduces additional traffic on the network.

In one approach, each CNM packet may include the feedback value, value, $Q_{offset}$, and $Q_{delta}$. With this information, the QCN CP may set the L3/L4 headers so that the CNM appears to be an ECE packet, such as via by setting the CWR, etc.

This provides for inter-operation between DCTCP and QCN. In this embodiment, one CNM replaces multiple DCTCP ECNs. These QCN CNMs may also be seen as ECN extensions, having multi-bit congestion severity directly built-in. No need for complex serial processing of the ECN series is necessary in order to provide the desired congestion notification and management.

Furthermore, this embodiment may be used directly (backward) from CP to the DCTCP source, without the standard ECN end-to-end long delays typically encountered. This direct CNM/ECN feedback may also be utilized in overlay networks using tunnels (NVGRE, VXLAN, etc.).

Figure 9:
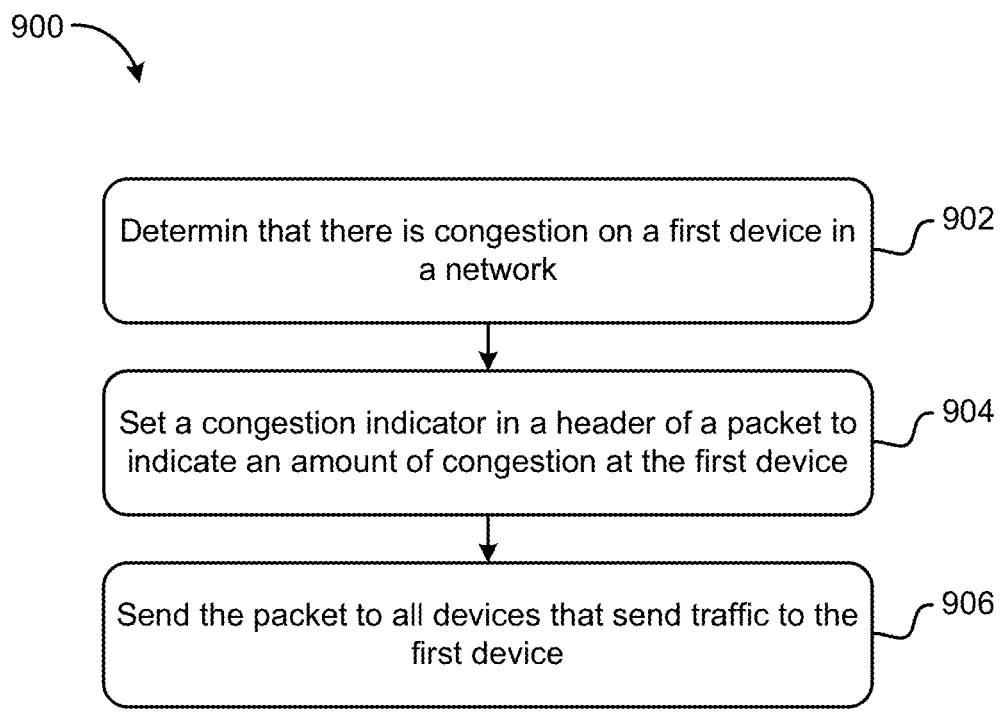
FIG. 9 is a flowchart of a method, according to one embodiment.

Now referring to FIG. 9, a method 900 for handling congestion in a network is shown according to one embodiment. The method 900 may be performed in accordance with the present invention in any of the environments depicted in FIGS. 1-8, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in one embodiment, the method 900 may be partially or entirely performed by a cluster of switches, one or more vSwitches hosted by one or more servers, a server, a switch, a switch controller (such as a SDN controller, OpenFlow controller, etc.), a processor, e.g., a CPU, an application specific integrated circuit (ASIC), a field programmable gate array (FPGA), etc., one or more network interface cards (NICs), one or more virtual NICs, one or more virtualization platforms, or any other suitable device or component of a network system or cluster.

In operation 902, it is determined that there is congestion on a first device in a network. The first device may be physical or virtual, and may be a switch or switching device, an intermediate device in the network, a L3 device, a L2 device, or any other suitable device (physical or virtual) which has an output queue and is capable of determining an occupancy of that output queue. The network may include L2 devices, L3 devices, and any combination thereof. In addition, the network may include virtual overlay tunnels, which may be operational in the context of method 900, in various approaches. That is to say, method 900 may be executed across L2 devices and L3 devices operating tunnels across the L2 device infrastructure according to any desired overlay protocol, such as NVGRE, VXLAN, etc.

In one embodiment, congestion may be determined when an occupancy of the output queue of the first device is above a detection threshold. The detection threshold may be represented as a percentage of the total (100%) capacity of the queue, in one approach. In other approaches, an actual number of packets, an amount of data (in bytes), or any other measure of capacity of a queue may be used to represent the threshold.

In a further approach, the detection threshold may be a DCTCP and/or RED detection threshold (k), as described in more detail herein. This allows complicated QCN feedback computations to be avoided in implementation of method 900.

Furthermore, in some approaches, the detection threshold (k) may be set to an equilibrium length for the queue ($Q_{eq}$), with $Q_{eq}$ possibly being set to a value between about 10% and about 25%, such as about 15%.

In operation 904, a congestion indicator is set in a header of a packet to indicate an amount of congestion at the first device. This congestion indicator may be a single bit, which in one state (e.g., 0) indicates a lack of congestion, and the other state (e.g., 1) indicating congestion.

In a another embodiment, the congestion indicator may be a multi-bit indicator that indicates a severity of the congestion, such as a 2-bit, 4-bit, 6-bit, 8-bit, etc., indicator. Each state of the multi-bit indicator indicates an increasing level of congestion and/or alarm or alert conditions that should be given higher priority when received by the sending device.

In operation 906, the packet is sent to one, some, or all devices that send traffic to the first device. The packet may be sent as or resemble a CNM packet, an ECN ECHO packet, an acknowledge CNM packet (ACK-type CNM), or as or resembling any other type of packet that is able to be understood by the recipient device as would be known to one of skill in the art. Which devices receive the packet may be determined based on an amount of traffic being sent by a particular device, e.g., the device is sending an amount of traffic which is causing the congestion. For example, if device A is consistently sending more than 500 MB of data over a given time period, while device B, device C, and device D only send less than 10 MB of data in the same time period, a packet having the congestion indicator may be sent only to device A, allowing devices B-D to operate normally while device A is required to restrict its outgoing traffic to the first device.

In one approach, the packet may comprise a source address (SRC) as a hotspot MAC address, a destination address (DST) as a source of offending traffic received by the first device, and feedback indicating a queue offset ($Q_{offset}$) and a change in queue ($Q_{delta}$) since last packet was sent.

In one embodiment, method 900 may further include receiving the packet having the multi-bit congestion indicator in a header thereof at a device that sends traffic to the first device and reducing a congestion window, such as by a factor of between about 5% and about 50%, or more or less, based on a severity of the congestion indicated by the multi-bit indictor. In this way, the congestion window is reduced by a greater factor when the congestion is indicated as being more severe. For example, the congestion window may be reduced by only 5% when the congestion indicator is set to the least severe congestion, whereas the congestion window may be reduced by 50% when the congestion indicator indicates the most severe congestion and/or some type of alarm or alert condition.

In a further embodiment, the multi-bit indicator may be set according to feedback (FB) that is based on an equilibrium length for the queue ($Q_{eq}$), a change in occupancy of the queue ($Q_{delta}$) an offset of the queue ($Q_{offset}$) and a predetermined constant (w). In this embodiment, $Q_{delta}$ may be calculated as a difference between a last occupancy of the queue ($Q_{old}$) and a current occupancy of the queue ($Q_{now}$) such that $Q_{delta}=Q_{old}-Q_{now}$, and $Q_{offset}$ may be calculated as a difference between $Q_{eq}$ and $Q_{now}$ such that $Q_{offset}=Q_{eq}-Q_{now}$. Furthermore, in one approach, the feedback may be calculated as follows: $FB=Q_{offset}+w*Q_{delta}$, wherein w is a number greater than 1, such as 1.25, 1.5, 2, 3, 4, 6, 10, etc.

In various other embodiments, some or all operations of method 900 may be implemented in a system with logic, a computer program product using program code, or some other implementation that would be known by one of skill in the art upon reading the present descriptions.

In an exemplary embodiment, a system comprises a processor (e.g., a CPU, an ASIC, a FPGA, etc.) and logic (hardware, software, or a combination thereof) integrated with and/or executable by the processor. The logic may be configured to determine that there is congestion on a first device in a network, set a congestion indicator in a header of a packet to indicate an amount of congestion at the first device, and send the packet to all devices that send traffic to the first device. The logic and/or processor may be resident or operational on the first device, or it may be positioned on a SDN or some other type of switch controller, on a network controller, etc., which are remote from the first device but are configured to communicate with the first device.

In another exemplary embodiment, a computer program product may comprise a computer readable storage medium having program code embodied therewith, the program code readable/executable by a device (e.g., a computer, a processor, a switch, a router, a processing circuit, etc.) to cause the execution of some or all operations of method 900.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a hardware processor; and
logic integrated with and/or executable by the processor, the logic:
 determining that there is congestion on a first device in a network;
 setting a congestion indicator in a header of a packet to indicate an amount of congestion at the first device; and
 sending the packet to all devices that send traffic to the first device,
wherein the congestion indicator is a multi-bit indicator that indicates a severity of the congestion, the multi-bit indicator being set according to feedback (FB) that is based on an equilibrium length for a queue ($Q_{eq}$), a change in occupancy of the queue ($Q_{delta}$), an offset of the queue ($Q_{offset}$), and a predetermined constant (w), wherein $Q_{delta}$ is calculated as a difference between a last occupancy of the queue ($Q_{old}$) and a current occupancy of the queue ($Q_{now}$) such that $Q_{delta}=Q_{old}-Q_{now}$, and wherein $Q_{offset}$ is calculated as a difference between $Q_{eq}$ and $Q_{now}$ such that $Q_{offset}=Q_{eq}-Q_{now}$.

2. The system as recited in claim 1, wherein the packet comprises:
a source address as a congestion hotspot media access control (MAC) address;
a destination address as a source of offending traffic received by the first device; and
feedback indicating a congestion level measured at a congestion point in the network.

3. The system as recited in claim 2, wherein the feedback is computed based on queue occupancy and queue occupancy change.

4. The system as recited in claim 1, the logic:
receiving the packet having the multi-bit indicator in a header thereof at a device that sends traffic to the first device; and
reducing a congestion window based on a severity of the congestion indicated by the multi-bit indicator,
wherein the congestion window is reduced by a greater factor when the congestion is indicated as being more severe.

5. The system as recited in claim 1, wherein the feedback is calculated as follows: $FB=Q_{offset}+w*Q_{delta}$, wherein w is a number greater than 1, wherein a congestion window is reduced by a factor of between about 5% and about 50%, and wherein the feedback comprises the queue offset ($Q_{offset}$) and the change in queue ($Q_{delta}$) since a last packet was sent.

6. The system as recited in claim 1, wherein the logic determines that there is congestion on the first device in the network by determining that an occupancy of a queue of the first device is above a detection threshold.

7. The system as recited in claim 6, wherein the detection threshold is a data center transmission control protocol (DCTCP) detection threshold and/or random early detection (RED) detection threshold (k).

8. The system as recited in claim 7, wherein the detection threshold (k) is set to the equilibrium length for the queue ($Q_{eq}$).

9. The system as recited in claim 8, wherein $Q_{eq}$ is set to a value between about 10% and about 25%.

10. A method for handling congestion in a network, the method comprising:
determining that there is congestion on a first device in a network;
setting a congestion indicator in a header of a packet to indicate an amount of congestion at the first device, wherein the congestion indicator is a multi-bit indicator that indicates a severity of the congestion; and
sending the packet to at least one device that sends traffic to the first device,
wherein the multi-bit indicator is set according to feedback (FB) that is based on an equilibrium length for a queue ($Q_{eq}$), a change in occupancy of the queue ($Q_{delta}$), an offset of the queue ($Q_{offset}$), and a predetermined constant (w), wherein $Q_{delta}$ is calculated as a difference between a last occupancy of the queue ($Q_{old}$) and a current occupancy of the queue ($Q_{now}$) such that $Q_{delta}=Q_{old}-Q_{now}$, wherein $Q_{offset}$ is calculated as a difference between $Q_{eq}$ and $Q_{now}$ such that $Q_{offset}=Q_{eq}-$ $Q_{now}$, and wherein the feedback is calculated as follows: $FB=Q_{offset}+w*Q_{delta}$, wherein w is a number greater than 1.

11. The method as recited in claim 10, wherein the packet is sent only to one or more devices that send an amount of traffic to the first device which causes the congestion.

12. The method as recited in claim 10, wherein the packet comprises:
   a source address as a congestion hotspot media access control (MAC) address;
   a destination address as a source of offending traffic received by the first device; and
   feedback indicating a congestion level measured at a congestion point in the network.

13. The method as recited in claim 12, wherein the feedback is computed based on queue occupancy and queue occupancy change.

14. The method as recited in claim 10, further comprising:
   receiving the packet having the multi-bit indicator in a header thereof at a device that sends traffic to the first device; and
   reducing a congestion window by a factor of between about 5% and about 50% based on a severity of the congestion indicated by the multi-bit indicator,
   wherein the congestion window is reduced by a greater factor when the congestion is indicated as being more severe.

15. The method as recited in claim 10, wherein the determining that there is congestion on the first device in the network comprises determining that an occupancy of a queue of the first device is above a detection threshold.

16. The method as recited in claim 15, wherein the detection threshold is a data center transmission control protocol (DCTCP) detection threshold and/or random early detection (RED) detection threshold (k), wherein the detection threshold (k) is set to an equilibrium length for the queue ($Q_{eq}$), and wherein $Q_{eq}$ is set to a value between about 10% and about 25%.

17. A computer program product for handling congestion in a network, the computer program product comprising a computer readable storage device, wherein the computer readable storage device is not a transitory signal per se, the computer readable storage device having program instructions embodied therewith, the program instructions readable by a processor to cause the processor to perform a method comprising:
   determining that there is congestion on a first device in a network;
   setting a congestion indicator in a header of a packet to indicate an amount of congestion at the first device, wherein the congestion indicator is a multi-bit indicator that indicates a severity of the congestion; and
   sending the packet to all devices that send traffic to the first device,
   wherein the multi-bit indicator is set according to feedback (FB) that is based on an equilibrium length for a queue ($Q_{eq}$), a change in occupancy of the queue ($Q_{delta}$), an offset of the queue ($Q_{offset}$), and a predetermined constant (w),
   wherein $Q_{delta}$ is calculated as a difference between a last occupancy of the queue ($Q_{old}$) and a current occupancy of the queue ($Q_{now}$) such that $Q_{delta}=Q_{old}-Q_{now}$,
   wherein $Q_{offset}$ is calculated as a difference between $Q_{eq}$ and $Q_{now}$ such that $Q_{offset}=Q_{eq}-Q_{now}$, and
   wherein the feedback is calculated as follows: $FB=Q_{offset}+w*Q_{delta}$, wherein w is a number greater than 1.

* * * * *